United States Patent [19]

Renken et al.

[11] Patent Number: 4,720,066
[45] Date of Patent: Jan. 19, 1988

[54] FLAP/SPOILER COMBINATION

[75] Inventors: Juergen Renken, Freyersen; Wilhelm Martens, Delmenhorst, both of Fed. Rep. of Germany

[73] Assignee: MBB GmbH, Bremen, Fed. Rep. of Germany

[21] Appl. No.: 900,507

[22] Filed: Aug. 26, 1986

[30] Foreign Application Priority Data

Aug. 29, 1985 [DE] Fed. Rep. of Germany ....... 3530864
Jun. 26, 1986 [DE] Fed. Rep. of Germany ....... 3621401

[51] Int. Cl.⁴ ................................................ B64C 9/12
[52] U.S. Cl. ................................ 244/213; 244/215; 244/76 R
[58] Field of Search ............... 244/203, 213, 215, 216, 244/217, 219, 76 R

[56] References Cited

U.S. PATENT DOCUMENTS 3,987,983 10/1976 Cole ...................................... 244/216
4,120,470 10/1978 Whitener ............................ 244/215

FOREIGN PATENT DOCUMENTS 1568250 5/1980 United Kingdom ................ 244/213
2096551 10/1982 United Kingdom ................ 244/213

Primary Examiner—Joseph F. Peters, Jr.
Assistant Examiner—Rodney Corl
Attorney, Agent, or Firm—Ralf H. Siegemund

[57] ABSTRACT

A flap arrangement for an aircraft wing having along its trailing edge independently actuated high lift flap and spoiler. During cruising the flap is used for camber line curvature control while the spoiler is controlled in a follow up configuration such that a gap between the spoiler and the high lift flap does not form.

4 Claims, 5 Drawing Figures

FLAP/SPOILER COMBINATION

BACKGROUND OF THE INVENTION

The present invention relates to a flap arrangement for an aircraft wing or air foil and including at least one high lift flap with an associated spoiler arranged along the trailing edge of the wing or airfoil and wherein adjusting devices are provided for operating the spoiler and the flap.

Generally speaking a flap arrangement of the kind to which the invention pertains is known for example through British Pat. No. 1,568,250. In this known device the high lift flap and the spoiler are associated with separated adjusting devices for operating them whereby generally the operation distinguishes between a normal or retracted position and a protracted, advanced operating or extended position. Each of the respective adjusting devices operates basically between these two limit positions of operation.

In addition German printed Pat. No. 2,725,632 teaches a flap arrangement wherein for purposes of controlling a rear or trailing edge flap and particularly for controlling the gap flow that occurs on pivoting this flap, an auxiliary flap is provided being operated by an actuating mechanism which is mechanically and kinematically coupled to the rear or trailing edge proper of the wing.

These known flap systems are operated such that during cruising of an aircraft they are fully retracted to provide a trailing edge aerodynamic continuation of the wing contour as a whole and as smooth as possible as far as surface contour is concerned. German printed patent application No. 31 14 143 (see also U.S. application, Ser. No. 366,250, filed Apr. 2, 1982 ) proposes a method of using exhisting flap systems for optimizing cruising at high altitudes particularly in the case of transsonic wings. The method involves particularly modifying the curvature of the camber line during cruising, in dependence upon relevant and critical flight parameters such as weight, speed and altitude.

In conjunction therewith it has been proposed to construct the spoiler to be flexible with regard to bending and to tension bias the spoiler tight against the respective high lift flap. This way one makes sure that the spoiler will always be held against the flap and thus follow a flap deflection particularly if during a camber change the high lift flap is pivoted. This flexible spoiler thus ensures that the contour of the wing remains aerodynamically favorable and avoids particularly the formation of a parasitic gap between the high lift flap and the spoiler.

DESCRIPTION OF THE INVENTION

It is an object of the present invention to provide a new and improved flap arrangement which provides the contour continuation during flap operation in a new and improved manner thus deviating from the method and principles employed in the said German patent application No. 31 14 143 but without incurring a more complex construction; it is thus a particular object of the present invention to provide a new and improved flap arrangement for an aircraft wing to be arranged along the trailing edge of the wing and including basically a high lift flap, a spoiler associated therewith and adjusting devices for the high lift flap and the spoiler.

In accordance with the preferred embodiment of the present invention the objects are obtained by providing an operative connection device between the controllers for the actuators respectively of the spoiler and the high lift flap either directly or individually in such a manner that the spoiler will follow any displacement by the flap such that any gap that would form otherwise, will not form; this follower movement of the spoiler will not obtain on account of any mechanical bias of the spoiler against the flap, rather it is a controlled positioning. Two approaches are suggested, a direct one and an indirect one. In the direct one, the output of the controller for the high lift flap is connected by means of an interface connection to the input of the controller for the spoiler actuator. The interface connection is rendered inactive during landing and possibly also during take off.

The indirect approach does not couple the two controllers together. Rather a proximity sensor is used to monitor the tendency of any gap to form between spoiler and flap, and a suitable output of the proximity sensor will then control the spoiler's position towards reducing this gap to zero.

In either case and approach, the advantage obtains that the actuators as well as the controllers for the high lift flap and for the spoiler are made to cooperate such that upon a desired chamber change for the wing during cruising this is an automatic follow up of the spoiler with regard to any chamber curvature modifying, pivoting and/or deflection of the high lift flap such that the contour of the airfoil remains aerodynamically favorable as is required, under particular avoidance of a gap formation. Moreover this arrangement prevents additional forces from acting on the spoiler which is more or less unavoidable if the spoiler is biased by tensioning. Also it is avoided that the spoiler is required to have very particular properties having to do with elasticity and resiliency. It is seen therefore that the inventive system can be added to exhisting conventional spoiler and high lift flaps so as to impart upon them the capability of camber curvature control during cruising without requiring mechanical supplementation.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding to the detailed description of the drawings, FIG. 1 illustrates a transsonic wing 1 and particularly a trailing edge portion thereof. The edge includes a high lift flap 2 and upstream therefrom is provided a spoiler 3. The flap arrangement is shown as far as the spoiler 3 is concerned, for regular cruising which means that the spoiler is held tight against the forward portion of the high lift flap 2 to avoid parasitic flow gap formation. The flap 2 is drawn in solid lines in the regular position; the dash dot lines denote various adjusted positions for camber modification to be used when cruising. These positions differ from the fully retracted position as well as from each other by pivoting about a vertical axis and about a horizontal axis as well as by translatory motion. A favorable kinematics for this purpose is also shown in U.S. patent application of common assignee Ser. No. 877,106, filed June 27, 1986. Vertical axis pivoting obtains on unequal protraction by the two threaded spindle drive sleeves 4c and 4'c driven by a common shaft 4b. These sleeves 4c, 4'c respectively drive spindles 4d, 4'd being coupled to flap 2 for actuating the same. Horizontal axis pivoting of flap 2 is further tied to protraction by a curved rail system.

Figure 2:
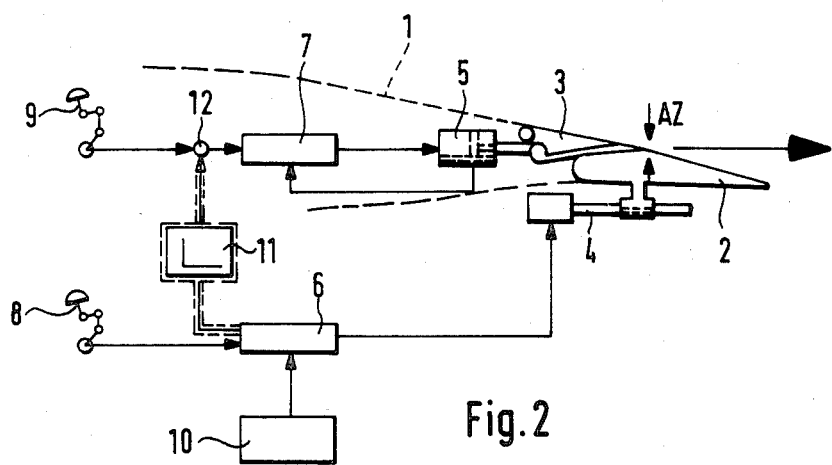
FIG. 2 is a somewhat schematic section view of the device shown in FIG. 1 but being supplemented by a block diagram illustrating the practicing of the invention.

Further details are discernible from FIG. 2. The main contour of wing 1 is shown in a dashed line only; the flap 2 and the spoiler 3 are shown in solid lines. An actuator arrangement 4 acts on the flap 2; it includes a drive motor 4a and a spindle 4d threaded in the threaded sleeve 4c in order to obtain flap movement (protraction/retraction) and pivoting. Reference numeral 5 refers to a hydraulic i.e. cylinder piston system for pivoting the spoiler 3. It should be noted however that these particular type of actuators are by way of example only; the invention can be practiced basically with any kind of actuators; the particular actuators 4 and 5 are illustrated here simply because they are being used in some aircraft, and the invention can well be practiced by retrofitting existing equipment.

6 and 7 refer generally to controllers respectively for the actuators 4 and 5. The controllers 6 and 7 are separate and distinct from each other as far as basic operations are concerned. Accordingly the controllers 6 and 7 are themselves separately controlled through levers 8 and 9 respectively which are arranged e.g. in the cockpit and are manipulated by the pilot doing take-off and landing. The signal generated by lever 9 is applied to a summing point 12 whose output feeds controller 7. The system basically ensures that during landing and take-off the flap 2 and the spoiler 3 (when needed) can be adjusted independently e.g. on the basis of judgement by the pilot. This normal actuator system and its control as well as manual actuation (one can use an auto pilot instead) to obtain an independent operation of the flap 2 and/or the spoiler 3 is required during the take-off and-/or landing phases. The invention now is related specifically to the instances of supplemental use of these pieces of equipment during high speed, high altitude cruising for purposes of camber line curvature control.

First of all the controller 6 generally receives a second input derived from a computer system 10. This system may include auto pilot operation but presently only operation during high speed, high altitude cruising is of interest so that the computer system 10 can be considered to be limited in purpose and function for that purpose. For this, the computer 10 receives on a running basis and in a real time operation, actual flight parameters such as altitude, speed and weight of the aircraft. Basically the computer will calculate the requisite camber curvature to optimize the aerodynamic effectiveness of the wing during cruising. The computer will then calculate the requisite control signals for purposes of controlling this and other controllers 6 being the immediate control devices for actuators such as 4 so that the flap 2 and others to be deflected so as to obtain the desired camber curvature.

The foregoing is a prerequisite for purposes of practicing the invention. In addition now a connecting module or device 11 is interposed having the structure and function of an electronic interface. The input of this interface 11 is connected to another output of the controller 6 which provides basically the same kind of output controller 6 provides to actuator 4 except that the signal level may be a more suitable one since the output of controller 6 is fed to a power device 4a while 11 is an electronic device.

The output of interface 11 is connected to the second input of summing point 12 so that it is also connected to the input of the controller 7 for the actuator 5. The output of interface 11 is therefore a supplement or an alternative to the input provided to the controller 7.

Interface 11 is configured so as to simulate or synthesize a polynomial representing in fact a function linking geometric connection and linkage of the extension of flap 2 and the width AZ of the gap which would or could be produced between flap 2 and spoiler 3 if the flap 2 is extended and nothing is changed as far as the position of the spoilers is concerned. The invention now functions as follows. During take-off and landing of the aricraft spoiler 3 and high lift flap 2 are conventionally i.e. independently actuated either by the levers 8 and 9 or by an auto pilot or by a combination thereof. The operation may be such that during these phases computer 10 provides a particular output which functions in effect as a zero input or is interpreted by the controller 6 as a zero input for the interface 11. Alternatively a manual switch may simply interrupt this linkage.

Figure 1:
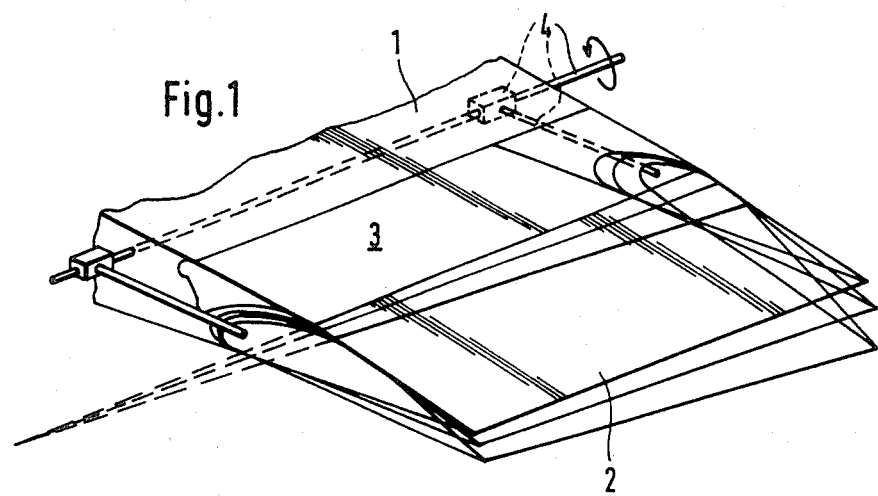
FIG. 1 is a perspective view from the top of a portion of a transsonic wing with spoiler and trailing flap, and in which the invention can be practiced.

Now during cruising the linkage is put into operation and the computer 10 controls primarily the controller 6 which operates the actuator 4 as stated above, for purposes of camber curvature control. Levers 8 and 9 are not operated. Basically this means that the flap 2 varies between the various positions illustrated in FIG. 1 (and possibly others). Here it will be observed that two different actuator portions 4c, 4'c are being operated in common by controller 6, a common drive 4a and shaft 4b whereby the speed for the two spindles may differ to affect different portions of the flap 2 differently so that in fact a two dimensional pivoting obtains as illustrated by the dash and dash-dot lines in FIG. 1. Now in addition the interface 11, being as stated a microprocessor, will calculate or simulate a polynomial relationship using the control signal provided by the controller 6 to the actuator 4, and will calculate an actuation motion for the spoiler 3.

The position and deflection for the flap 2 as controlled by the controller 6 in each instance will result in a certain gap AZ, all other conditions being equal, and assuming the spoiler 3 does not change position. Now the geometric relationship that is stored in a polynomial fashion in the microprocessor of interface 11 will calculate an input signal for the controller 7 such that actuator 5 is operated to close that gap AZ. This offset signal therefore functions as a kind of follow-up for the spoiler 3 such that for each movement of the flap 2 the spoiler assumes the requisite position that keeps the gap closed. It should be realized that the actuators function sufficiently fast so that the follow up operation based on eelctronic calculations is not only maintained in end positions or in attained control positions for the flap 2 but as the flap 2 moves from one position to another in order to obtain the requisite camber curvature configuration, spoiler 3 readily follows so that even during this change the gap will remain closed; the spoiler remains in abutment with the flap 2.

Figure 3:
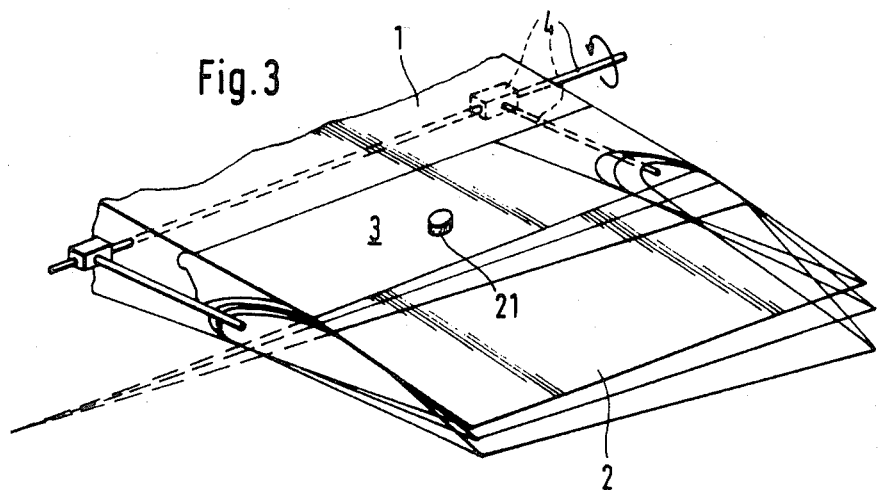
FIG. 3 is a view similar of FIG. 1 but of a modified wing.

FIG. 3 illustrates a modified example. Again there is shown a transsonic wing 1 with high lift flap 2 and spoiler 3 and the spoiler abuts tightly the flap 2 during regular cruising. Also, FIG. 3 shows just, as FIG. 1 does, various dispositions the flap 2 may assume during cruising for purposes of camber line curvature control. Turning now to further still similar details shown particularly in FIGS. 4 and 5 again the wing 1 is illustrated as to its major parts by a dashed line. Only the spoiler 3 and the high lift flap 2 is drawn in solid lines. A hydraulic actuator 5 is provided for the spoiler 3 and a mechanical spindle drive 4 for the flap 2. It can also be said here that different kinds of arrangements can be used for actuating the flap and the spoiler. Also quite analogously to FIG. 2 there is shown a controller 6 for the actuator 4 to be actuated by a manual lever 8 arranged in the cockpit, while the actuator 5 is connected to a controller 7 which in turn is operated from the cockpit by a lever 9. Also, in the case of high speed, high altitude cruising the controler 6 for the flap 2 is controlled by a computer 10 in accordance with the rules expounded above concerning camber line curvature control.

Figure 5:
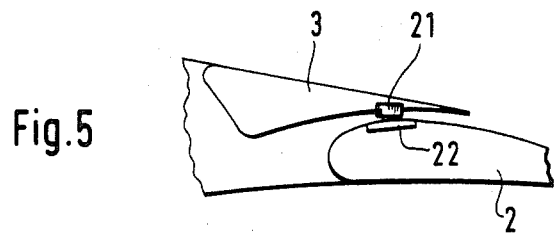
FIG. 5 is an enlargement of a portion as indicated by the dashed dot rectangle in FIG. 2.
Figure 4:
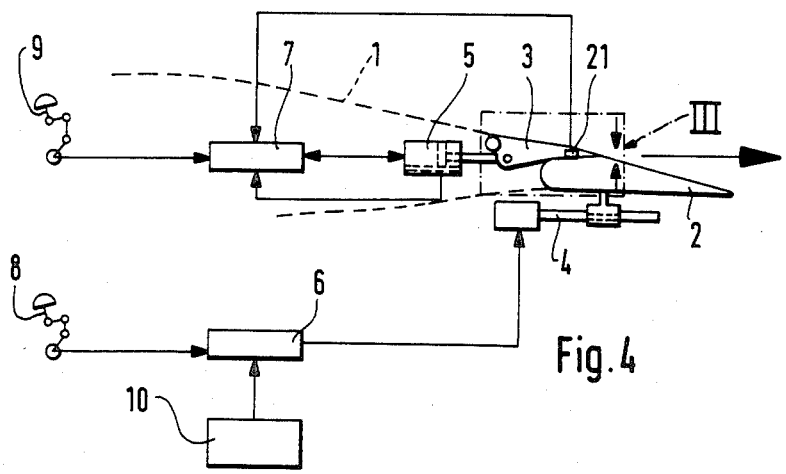
FIG. 4 is a section and schematic view analogous to FIG. 2 but related to FIG. 3

FIG. 4 basically differs from FIG. 2 through the arrangement and mode of coupling the two control circuits to obtain follow up control each other. In this case then a proximity sensor 21 is provided which is mounted as shown in FIG. 5 on the spoiler 3 and is cooperating with a certain area 22 on the flap 2 and to be described more fully below. Hence the transducer or proximity sensor 31 furnishes an electrical signal that is indicative of the proximity of that part of the spoiler 3 from the flap 2. Specifically of course what is monitored and sensed is the proximity of the sensor 21 to the particular area 22.

Depending upon the physics involved, the area 22 is optimized for the operation of that sensor 21 and may, therefore, as far as the flap 2 is concerned, include a special coating, cover or the like. In case of an inductive method, 22 may be a magnetizable coating. In the case of an electrostatic method for proximity sensing, 22 may be electrically conductive coating, or an insulating layer on top a conductor! If an optical method is used, 22 may be highly reflective. Also it should be mentioned that 21 and 22 are dynamically exchangeable, in other words the proximity sensor may be provided on the flap 2 cooperating with a particular area, zone etc. 22 on spoiler 3. The output of the sensor 21 is furnished as an output to the controller 7a in either case.

The devices operate as follows. During take-off and landing high lift flap 2 and spoiler 3 are independently operated and manipulated by operation of the levers 8 and 9. Through suitable circuitry the effectiveness of the output of transducer 21 may be suppressed. The flap and spoiler operation is therefore independent from each other during take-off and/or landing phases. Now, during cruising particularly high altitude, high speed cruising the computer 10 takes over as far as the control circuit 6 is concerned, and controls the actuator 4 to vary the camber curvature of the wing. This operation is quite similar to the one described with reference above to FIG. 2. Now however during high speed cruising proximity sensor and transducer 21 provide a signal that relates spatially i.e. as far as distance is concerned, flap 2 and spoiler 3 to each other. The signal furnished by the transducer 21 may be electrical as well as optical but provides a control input for the circuit 7. This means that the actuator 5 is actuated by the controller 7 during this phase such that the proximity sensor will move towards zero or at least near zero proximity or distance. Also as mentioned above this follower control is sufficiently fast so that as the flap 2 is moved in between the various positions as indicated in the drawings, the follow up control for the spoiler 3 is sufficiently fast so that the spoiler remains in effect in touching position with the flap 2 to avoid opening of a gap between these two parts.

If for any reason the spoiler is provided in a flex bending configuration it may well be advisable to provide several proximities sensors and to provide for the statistical distribution of the ascertained spacing value to obtain a more sophisticated control of the flexible spoiler towards reducing the gap width between it and flap 2 to zero.

The invention is not limited to the embodiments described above but all changes and modifications thereof, not constituting departures from the spirit and scope of the invention, are intended to be included.

We Claim:

1. In a flap arrangement for an aircraft wing having along its trailing edge a high lift flap and a spoiler associated therewith and arranged upstream therefrom, there being a first actuator with first controller connected for operating the high lift flap, there being a second actuator with second controller connected for operating the spoiler, the improvement comprising, means (i) for providing a signal being indicative of the disposition of the high lift flap in relation to said spoiler; and means (ii) connected to the means (i) and to the second controller of the spoiler for operating the second controller and actuator such that a gap between the spoiler and the high lift flap does not form, so as to obtain follow up positioning of the spoiler in relation to movement and actuation of the high lift flap.

2. The improvement as in claim 1 wherein said means (ii) is constructed as an electronic interface being connected to the first controller to provide a signal that is representative of the geometric relationship between the high lift flap and the spoiler, said signal being fed to the second controller to operate said second controller and spoiler.

3. The improvement as in claim 2 wherein said electronic interface is constructed as a processing unit realizing a polynominal relationship.

4. The improvement as in claim 1 wherein said means (i) is a proximity sensor for sensing a gap between the spoiler and the flap and providing a signal being fed to the second controller towards maintaining said gap small or zero.

* * * * *